Feb. 6, 1962 R. COLMAN 3,019,700
RADIANT ENERGY METER
Filed March 14, 1958

INVENTOR.
ROBERT COLMAN
BY
Morgan, Finnegan, Durham & Pine

United States Patent Office 3,019,700
Patented Feb. 6, 1962

3,019,700
RADIANT ENERGY METER
Robert Colman, 2 Howard St., New York, N.Y.
Filed Mar. 14, 1958, Ser. No. 721,386
6 Claims. (Cl. 88—23)

This invention relates to the sensing of radiant energy and more particularly to an electronic, photosensitive device which provides an indication of radiation intensity levels in the range which includes infra-red, visible, and shorter wavelengths.

Devices responsive to radiation intensity are well known. There are numerous types which include light meters, exposure meters, infra-red detectors and those associated with the very short wavelengths, e.g., scintillation meters. These devices find application in the fields of optics, industrial control, nuclear physics and the like.

In one comparator-type of radiation meter, utilized to compare an unknown radiation level with a reference or standard level, two photosensitive elements in a bridge-type circuit are employed. The bridge is balanced when the unknown radiation impinging on one photosensitive element is equal to the reference radiation intercepted by the second photosensitive element. Departures of the unknown radiation level from the reference value cause unbalancing of the bridge thus yielding an output whose magnitude and polarity vary in accordance with the direction and degree of departure.

Other comparators follow a somewhat similar scheme but employ only one photosensitive element whose output is compared with some circuit parameter such as a reference voltage.

The present invention is related to the latter class of comparators in that it performs in a similar manner. It differs from its predecessors however in many respects including its simplicity, durability and compactness. It is also capable of measuring, after suitable calibration, absolute values of radiation intensity.

It is thus an object of this invention to provide a radiation meter whose components are simple, inexpensive and stable.

A further object of the invention is to provide radiation measurement with a circuit of simple configuration and simple power requirements.

An additional object of the invention is to provide a radiation meter which is sensitive to low illumination levels.

A further object of the invention is to provide a radiation meter which is sensitive over a wide range of radiation frequencies and which does not require a sensitive meter movement.

A still further object of the invention is to provide a radiation meter which is compact, portable, rugged to the extent of withstanding high acceleration and impact forces, and light, and which requires but a single operating adjustment.

An additional object of the invention is to provide a radiation sensitive device capable of comparative and absolute measurements.

Other objects and advantages of the invention will be set forth in part hereinafter and in part will be obvious herefrom, or may be learned by practice with the invention, the same being realized and attained by means of the instrumentalities and combinations pointed out in the appended claims.

By way of illustrating the principles of the invention reference may be had to the accompanying drawings wherein.

The invention consists in the novel parts, constructions, arrangements, combinations and improvements herein shown and described.

Figure 1:
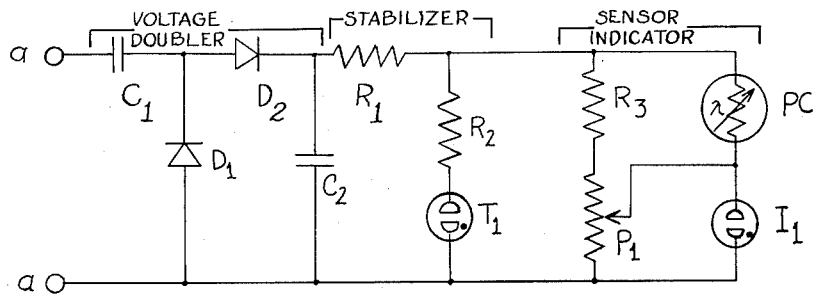
FIG. 1 is a schematic drawing of one preferred embodiment of the invention.

A schematic of one preferred embodiment of the invention is shown in FIG. 1. This circuit is energized at terminals $a$—$a$ by power from an alternating current source. The circuit can be described by considering its three basic stages: a Voltage Doubler, a Stabilizer stage and the Sensor-Indicator. The Voltage Doubler converts the alternating power applied at input terminals $a$—$a$ into pulsating direct current power in the well-known manner. The Stabilizer serves to present a relatively constant load to the Voltage Doubler and thereby provides adequate voltage regulation. The Sensor-Indicator is designed to receive radiant energy and to indicate either variations in the intensity of this radiation as measured from some predetermined value or to indicate the actual value of radiation intensity.

Capacitors $C_1$ and $C_2$ and semi-conductor rectifiers $D_1$ and $D_2$ are connected in a conventional voltage doubler arrangement. The Doubler is designed in this embodiment to receive 115 volt, 60 cycle power and to provide a pulsating voltage at the output, across capacitor $C_2$.

The output voltage of the Doubler tends to approach a peak value equal to twice the peak value of the input alternating polarity voltage. However the load comprising the Stabilizer and Sensor-Indicator offsets this tendency such that a somewhat smaller value of Doubler output is obtained. This output is nevertheless substantially greater than the peak value of the input voltage; in the preferred embodiment a D.C. component equal to approximately 280 volts is obtained. It is of course certain that an alternating supply of different voltage and frequency may be satisfactorily relied on for power. It may be necessary in such a case to change the circuit constants of the Voltage Doubler and perhaps some of the constants in the Stabilizer and Sensor-Indicator.

It should be equally clear that other forms of rectifiers may be employed including half-wave and full-wave rectifiers of both the series-parallel and bridge types. Voltage triplers, quadruplers, etc. may also be employed. Because the Stabilizer and Sensor-Indicator provide a relatively insignificant load, these rectifiers may be designed for very low current drain requirements. The output voltage required from the rectifier is principally determined by the voltage requirements of the Sensor-Indicator which depend in turn on the design voltage of the sensitive element in the Sensor-Indicator. This factor will be described in more detail hereinafter, but it should be noted at this point that the photosensitive element is not polarity sensitive and thus no need for polarizing the rectifier exists. Thus the rectifiers $D_1$ and $D_2$ may be reversed in their circuit positions. To energize the circuit a switch, not shown, may be used.

The Voltage Doubler of FIG. 1 provides a pulsating voltage of constant polarity which is applied to the Stabilizer comprising $R_1$, $R_2$ and gas tube $T_1$. Tube $T_1$, serving as a substantially constant load is, in the preferred embodiment, a neon tube such as the G.E. NE–2A. The Stabilizer serves to dampen the otherwise fluctuating load which results from the wide variation in impedance of the photosensitive element as it is subjected to extreme ranges of radiation intensity. If the circuit is used in applications involving restricted radiation ranges a stabilizer is not necessary. Gas tube $T_1$ may also serve incidentally as a power-on indicator.

The Stabilizer output appearing across resistor $R_2$ and gas tube $T_1$ is applied to the Sensor-Indicator comprising the voltage divider formed by resistor $R_3$ and potentiometer $P_1$, and the combination of Sensor, PC, and Indicator, $I_1$. Sensor PC is preferably a cadmium selenide photoconductive cell.

Appearing at the arm of potentiometer $P_1$ is an adjustable voltage which is applied to indicator $I_1$. The indicator is preferably a neon gas tube of the G.E. NE–2A type which has been sensitized by aging so that it fires at a nominal voltage, plus or minus ½ volt, as compared with a rated firing range of approximately 10 volts. The aging procedure is well known, being described in literature issued by the gas tube vendors. Resistor $R_3$ in series with $P_1$ limits the latter's effective range and thus may be eliminated when this limiting is not necessary.

The voltage applied to indicator $I_1$ depends not only on the setting of potentiometer $P_1$, but also on the impedance of the photosensitive element PC. For a particular impedance of the photosensitive element, which is determined by the intensity of the radiation incident thereon, the potentiometer $P_1$ may be adjusted so as to provide a potential at its arm which is adequate to ionize $I_1$. If the intensity of radiation changes, the potential applied to indicator $I_1$ will increase or decrease thus causing $I_1$ to extinguish or conduct to a greater degree.

The photosensitive element PC is, in the preferred embodiment, a photoconductive cell whose resistance varies at a particular radiation wavelength in accordance with the intensity of the radiation.

The choice of photoconductive cell depends among other factors on the particular radiation spectrum involved. Photo-conductive cells responsive to radiation throughout a substantial portion of the visible and infrared spectrum are well known and commercially available. A cell may be used in combination with filters and crystals to respond to any particular section of the radiant spectrum including the X-ray and gamma ray regions.

In addition to a photoconductive cell, the circuit of FIG. 1 may utilize a photovoltaic cell which is used, not in its voltage generating capacity, but rather as a variable radiant-sensitive impedance which varies in accordance with the magnitude of the incident radiant energy, the variation in certain of these cells being particularly marked at low illumination levels. In this application a photovoltaic cell is energized in a manner similar to the arrangement of photo-conductive cell PC of FIG. 1.

One further note is appropriate at this point: It has been stated hereinbefore that the Sensor-Indicator is energized by a pulsating constant polarity voltage. Contrary to the usually adverse effects of the ripple component of rectifier output voltage, the ripple component of the circuit of FIG. 1 has a beneficial effect. It acts somewhat like a dither signal tending to improve the response time of the circuit and serving to minimize the drift generally found in this type of direct current circuit.

Figure 2:
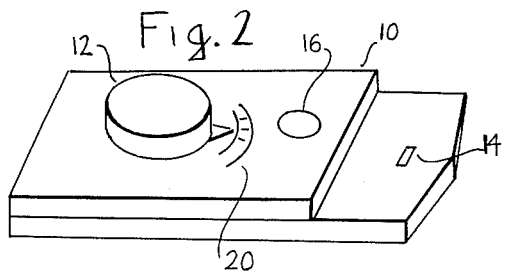
FIG. 2 is a perspective of the device in its assembled form.

The circuit of FIG. 1 has proved very successful in its operation, being capable for example of sensing light energy in the microlumen range. All of the components can be conveniently mounted in a small enclosure similar to that shown in FIG. 2. The enclosure 10 of FIG. 2 serves as a housing and support for the components. The arm of potentiometer $P_1$ is positioned by control 12. An aperture 14 provides an access for the radiant energy. The operation of indicator $I_1$ is viewed at port 16. A scale 20 is provided so that the position of the potentiometer control 12 can be indexed. The scale can be used in both tthe comparator function and for absolute readings as described hereinafter. The entire enclosure 10 can be substantially smaller than a cigarette package.

By way of illustrating one mode of operation, the invention will be described in terms of its application to the enlarging of photographs.

In the enlargement procedure the meter is utilized to determine the light intensity necessary to obtain the correct exposure for a desired tonal range. Both black-and-white and color enlargements may be controlled by use of the meter which has a high sensitivity. By use of the meter and by maintaining a constant exposure time, the proper aperture or $f$ stop may be obtained for any degree of enlargement without the need for calculation and trial-and-error testing.

In the enlarging operation the meter is placed approximately in the focal plane of the enlarging paper on the enlarging easel or baseboard. The aperture 14 is located so that some reference illumination, for example that corresponding to the middletone or highlight of a standard negative, passes through the aperture and illuminates the photoconductive cell. The aperture may be of any convenient size; for average size enlargements an aperture of 2 x 4 mm. is suitable.

With the reference illumination incident on the photoconductive cell, the control 12 is adjusted until the indicator $I_1$ just extinguishes. Since the voltage applied to the indicator is determined by the setting of potentiometer control 12 and by the photoconductive impedance, then the extinguishing of the indicator is directly related, for one control setting, to one particular light intensity.

If now another negative is substituted for the standard, and if the light incident on the photoconductive cell is varied until the indicator $I_1$ just extinguishes, then a duplication of the original light conditions is insured. Consistent results are attained by always reducing the illumination from an excess value to a value which just extinguishes the indicator. The point where the indicator just illuminates can also be used as a reference but is not as precise an indication for this embodiment and application. For varying the light conditions the control 12 may be placed in varying positions and the light intensity readjusted.

The adjustment of light conditions while working with different enlargements of the same negative can also be attained in the above-described manner.

For absolute measurement of radiation intensity or related parameters such a density, the scale 20 may be calibrated by adjusting the control 12 until indicator $I_1$ just extinguishes under reference conditions. The reference quantity may then be indicated on the scale 20. Also the pointer of the control may be slipped, relative to the arm of potentiometer $P_1$, to a reference position. Alternatively, the entire potentiometer or the scale may be moved to establish reference conditions. Where circuit constants and photoconductive cell characteristics, as indicated by the desired application of the meter, result in a non-linear relation between the potentiometer setting and the radiant energy level, calibration of the scale at several points will be necessary unless the potentiometer is contoured to compensate for the non-linearity or the scale is indexed in a predetermined, appropriate, non-linear fashion, e.g., logarithmically.

Another application of the meter illustrative of its capabilities relates to X-ray radiation. One is frequently interested in adjusting X-ray intensity to some predetermined level. In this connection the use of the meter is analogous to its employment in the photographic enlargement problem—control of the X-ray level rather than the light level being the object; a photoconductive cell responsive to the X-ray spectrum is used.

The meter has another important use in the X-ray field: it can serve as a go-no go gauge. For this purpose the control 12 is set to cause the indicator to extinguish, or illuminate, at some reference X-ray level, perhaps the maximum permissible level. Any radiation level in excess of this value causes the indicator to illuminate, or extinguish, to thereby serve as a warning that the permissible level has been exceeded. This and related purposes are readily served by the structure disclosed herein. It can be carried in one's pocket and connected to a convenient outlet or operated from batteries as described hereinafter.

In many applications a power supply is not convenient. In this event the basic Sensor-Indicator stage of FIG. 1 may be battery operated. Thus in FIG. 3 a battery or combination of batteries may be connected to terminals a—a; the battery voltage is determined by the type of photoconductive cell which is selected and the sensitivity which is desired. For example, a lead sulphide cell, useful in the infra-red range, has a different voltage requirement than a cadmium sulphide cell which is responsive to the visible spectrum. Of course more frequent calibration may be necessary when using batteries because of the gradual reduction of the terminal voltage. The use of batteries will in general also increase the minimum size of the entire configuration. If a wide range of radiation intensity values is anticipated, a voltage stabilizer may be used in combination with FIG. 3 in the manner shown in FIG. 1, if the battery internal impedance so dictates.

Figure 3:
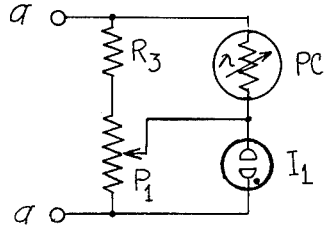
FIG. 3 is a schematic of the basic Sensing and Indicating circuit.

In applications where adequate sensitivity is obtained with voltages equal to or less than the line voltage, the circuit of FIG. 3, alone or in combination with the stabilizer of FIG. 1, may be energized directly from the alternating current source. Where the line voltage is excessive a simple voltage divider connected across the line may be employed with the desired voltage tapped from the divider. If the line voltage is not adequate it is generally more expedient to use the voltage rectifying and doubling arrangement of FIG. 1. The remaining circuitry of FIG. 3 is otherwise similar in construction to the one shown in FIG. 1, the voltage applied to the indicator being dependent upon the setting of potentiometer $P_1$ and the radiation sensitive impedance of the photoconductive cell PC. As in FIG. 1, a resistance $R_3$ is connected in series and with $P_1$ and serves to limit the shunting effect of the potentiometer on the cell PC and to limit the maximum voltage applied to the indicator $I_1$.

Figure 4:
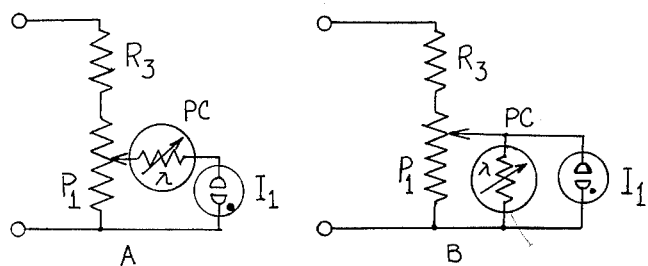
FIG. 4 is two schematics of alternate embodiments of the invention.

Two other circuits which function in a manner similar to that described in connection with FIGS. 1 and 3 are shown in FIG. 4. The purpose of these circuits is to obtain different response characteristics. In circuit A of FIG. 4 the entire voltage obtained at the arm of potentiometer $P_1$ is applied to the series connection of indicator $I_1$ and photoconductive cell PC. While modification of the voltage applied to the indicator $I_1$, as a result of changes in the resistance of cell PC, is similar to that occurring in FIG. 1, the magnitude of the change is different, i.e., the direction of change is the same: as the cell resistance of PC increases, the voltage applied to the indicator decreases, but the slope and end-points of the curve which describe the relationship between indicator voltage and cell resistance are different from that obtained in the circuit of FIG. 1.

Both variation in slope and a different direction of change are achieved in circuit B of FIG. 5—as the cell resistance increases, the voltage applied to indicator $I_1$ also increases.

The circuits of FIG. 4 are otherwise similar to the FIG. 1 embodiment, may be employed in a similar manner, and may operate from any supply with or without a voltage stabilizer or regulator.

Illustrative embodiments of the invention have been disclosed hereinbefore. It is apparent that other forms embodying the same principles may be employed and that modifications, alterations and changes may be made without departing from the true scope and spirit thereof.

What is claimed is:

1. Radiant energy sensing means comprising a voltage doubler including a pair of semi-conducting devices and a pair of capacitors, voltage stabilizing means comprising the series combination of a first resistor, a second resistor and a gas discharge tube, said series circuit being connected to the output terminals of said voltage doubler, voltage adjustment means comprising a series circuit connection of a resistor and a potentiometer said series circuit being connected across the combination of said second resistor and said gas discharge tube, a photoconductive cell connected between the arm of said potentiometer and one terminal of said series connection of resistor and potentiometer, and gas discharge indicating means connected to the arm of said potentiometer and the other terminal of said series connection of resistor and potentiometer whereby said gas discharge indicating means is jointly responsive to the setting of the arm of said potentiometer and the resistance of said photoconductive cell, said cell resistance being responsive to radiant energy.

2. Radiant energy sensing means comprising a supply of electrical energy, a voltage doubler energized by said supply and including a pair of semi-conducting devices and a pair of capacitors, voltage stabilizing means comprising the series combination of a first resistor, a second resistor and a gas discharge tube, said series circuit being connected to the output terminals of said voltage doubler, voltage adjustment means comprising a series circuit connection of a resistor and a potentiometer, said series circuit being connected across the combination of said second resistor and said gas discharge tube, a photoconductive cell connected between the arm of said potentiometer and one terminal of said series connection of resistor and potentiometer, gas discharge indicating means connected to the arm of said potentiometer and the other terminal of said series connection of resistor and potentiometer, component support means, said support means serving to enclose and support the aforesaid components, control means operably connected to said potentiometer, control position indicating means mounted on said component support means and an aperture in said component support means, said aperture providing radiant energy access to said photoconductive cell.

3. Radiant energy sensing means comprising a circuit for supplying electrical energy, a non-intergrating series parallel network energized by said electrical supply, said network including a potentiometer, an indicator and a non-polarized photosensitive element the resistance of which is responsive to radiant energy, said potentiometer being connected to said indicator and to said photosensitive element such that the voltage applied to said indicator is determined by the resistance of said photosensitive element and the adjustment of said potentiometer whereby said indicator may be energized for any magnitude of said radiant energy thus providing an indication of departures from said magnitude, housing means supporting and enclosing the aforesaid components, a scale mounted on said housing means, adjustment means operably connected to said potentiometer, said scale being located to indicate the position of said adjustment means, aperture means in said housing, said aperture means providing accessibility of said photosensitive element to radiate energy, and indicator viewing means providing a view of said indicator.

4. Radiant energy sensing means according to claim 3 in which said indicator is connected in shunt with a section of said potentiometer.

5. Radiant energy sensing means according to claim 3 in which said indicator is directly connected to said potentiometer such that said potentiometer may extinguish and energize said indicator independent of said resistance of said photosensitive element.

6. Radiant energy sensing means according to claim 3 in which the arm of said potentiometer is connected to the junction of said photosensitive element and indicator.

References Cited in the file of this patent

UNITED STATES PATENTS

| | | |
|---|---|---|
| 1,455,074 | Case | May 15, 1923 |
| 2,000,425 | Strauss | May 7, 1935 |
| 2,037,925 | Rentschler | Apr. 21, 1936 |
| 2,149,250 | Bing | Mar. 7, 1939 |
| 2,815,454 | Gilbert | Dec. 3, 1957 |

OTHER REFERENCES

Haviland: "The Versatile Neon Tube," Radio Electronics, vol. 24, No. 4, April 1953, pages 50–53.